United States Patent
Page et al.

(10) Patent No.: US 10,181,220 B2
(45) Date of Patent: Jan. 15, 2019

(54) SYSTEM AND METHOD FOR CONTACT CENTER AUGMENTED REALITY

(71) Applicant: NICE LTD., Ra'anana (IL)

(72) Inventors: Matthew Lawrence Page, Sandy, UT (US); Christopher Garn Seaman, South Jordan, UT (US); Adam Samuel Horrocks, Sandy, UT (US); Owen Edwin Graupman, Midvale, UT (US); Kacie Mayberry, Sandy, UT (US); Sean Arlington Kirkby, Orem, UT (US); Brian Douglas Minert, Orem, UT (US)

(73) Assignee: NICE LTD., Ra'anana (IL)

( * ) Notice: Subject to any disclaimer, the term of this patent is extended or adjusted under 35 U.S.C. 154(b) by 87 days.

(21) Appl. No.: 15/428,426

(22) Filed: Feb. 9, 2017

(65) Prior Publication Data
US 2018/0225874 A1    Aug. 9, 2018

(51) Int. Cl.
*G06T 19/00*    (2011.01)
*H04M 3/51*    (2006.01)
*G06F 3/01*    (2006.01)

(52) U.S. Cl.
CPC ............ *G06T 19/006* (2013.01); *G06F 3/013* (2013.01); *G06F 3/014* (2013.01); *G06F 3/015* (2013.01); *H04M 3/5175* (2013.01); *H04M 3/5191* (2013.01); *G06F 2203/011* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 6,724,887 B1 * | 4/2004 | Eilbacher | H04M 3/5183 379/265.02 |
| 2012/0110096 A1 * | 5/2012 | Smarr | H04W 4/21 709/206 |
| 2014/0108309 A1 * | 4/2014 | Frank | G06N 99/005 706/12 |

* cited by examiner

*Primary Examiner* — Michelle Chin
(74) *Attorney, Agent, or Firm* — Pearl Cohen Zedek Latzer Baratz LLP

(57) ABSTRACT

A contact center augmented reality system may include a supervisor device, a location tracker, a state monitor, and an augmenter. The supervisor device may include a display to augment a supervisor view of the contact center. The location tracker may monitor agent locations in the contact center and may monitor the supervisor device location in the contact center. The state monitor may monitor a state of agents of the contact center. The augmenter may instruct the display of the supervisor device to display an agent-state augmentation artifact such that a state of a first agent of the contact center is displayed at a location associated with the first agent.

21 Claims, 5 Drawing Sheets

SYSTEM AND METHOD FOR CONTACT CENTER AUGMENTED REALITY

FIELD OF THE INVENTION

The present invention relates generally to augmented reality for use for example in workplaces, such contact centers.

BACKGROUND

Contact centers may include physical locations that house personnel such as agents that participate in contacts with customers. The contacts may generally take place over a telephone connection, chat connection, or the like. The contact centers may further house supervisors or managers that supervise the agents. Agents may outnumber supervisors by for example ratios of about ten agents per supervisor to about twenty-five agents per supervisor, although any ratio of agents to supervisors may be possible. Working areas of the contact centers may be configured to accommodate a relatively high density of agents to promote an efficient use of space and/or to accommodate supervision of the agents.

The claimed subject matter is not limited to embodiments that solve any disadvantages or that operate only in environments such as those described above. This background is only provided to illustrate examples of where the present disclosure may be utilized.

SUMMARY

Embodiments of the invention include systems and methods for workplace (e.g. contact center) augmented reality.

In an embodiment, a contact center augmented reality system may include a supervisor device, a location tracker, a state monitor, and an augmenter. The supervisor device may include a display to augment a supervisor view of the contact center. The location tracker may monitor agent locations in the contact center and may monitor the supervisor device location in the contact center. The state monitor may monitor a state of agents of the contact center. The augmenter may instruct the display of the supervisor device to display an agent-state augmentation artifact such that a state of a first agent of the contact center is displayed at a location associated with the first agent.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features will become more fully apparent from the following description and appended claims.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

Figure 1:
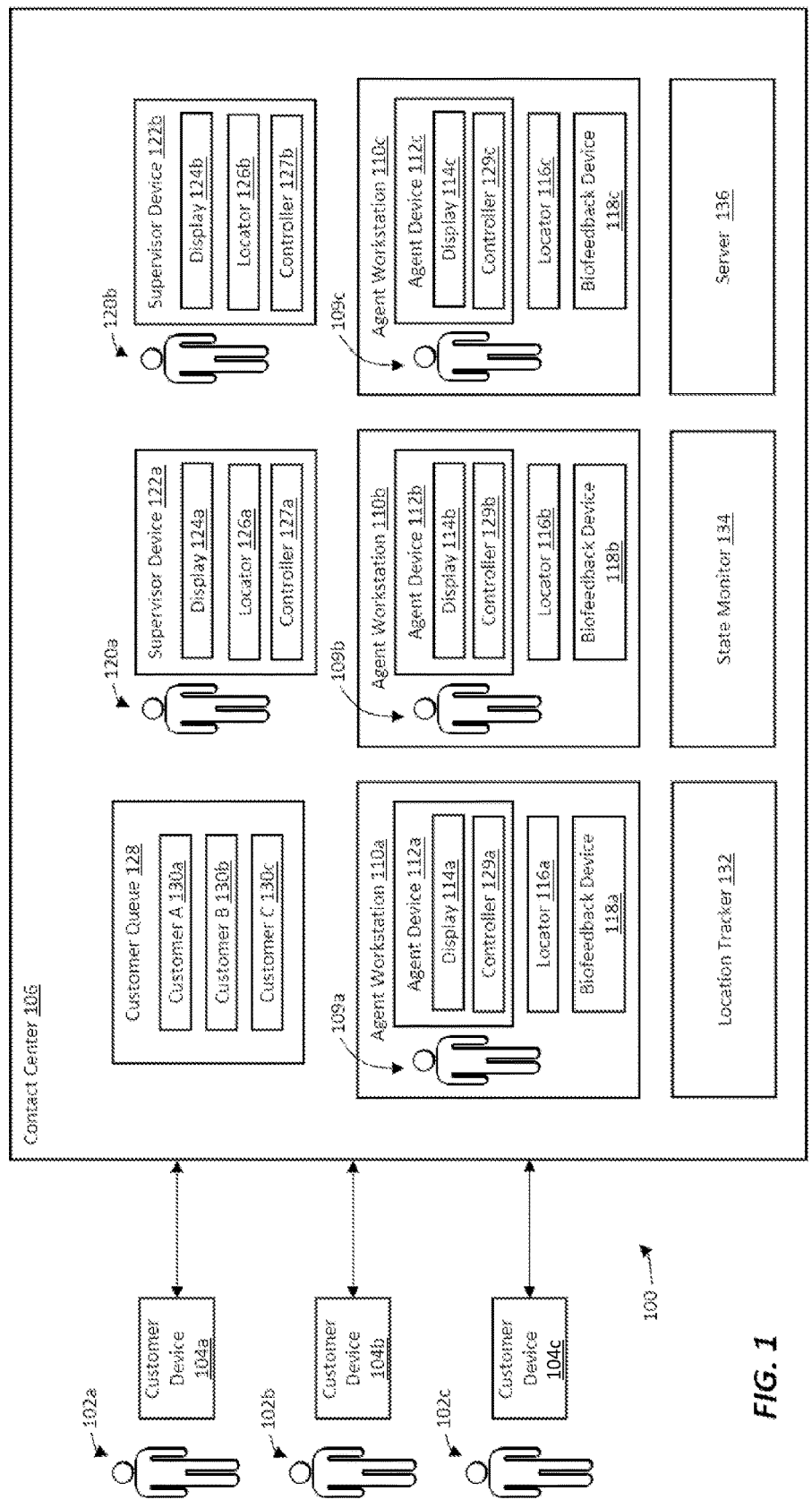
FIG. 1 illustrates an example contact center augmented reality system according to an embodiment of the invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Contact centers may include many agents or other personnel available to participate in contacts with customers. The contact centers may further include supervisors or managers who supervise the agents. The supervision may include general monitoring of the effectiveness and efficiency of agent, providing feedback and training to the agent, and the like. The supervision may alternately or additionally include real-time monitoring of the agents. A supervisor may listen to a conversation between the agent and a customer. Such monitoring may ascertain agent performance and customer satisfaction, and supervisors may listen or monitor for inappropriate remarks or vocabulary (e.g. on the part of the agent or the customer), lack of agent proactivity, agent lack of knowledge or skills, etc. For example, a supervisor may monitor a contact between an agent and a customer, may coach the agent through the contact, and/or may barge in on, intervene or interrupt the contact to communicate with the customer and/or the agent. While the supervisor typically remains in one place, e.g., at a desk or workstation, in some instances, the supervisor may move to the location of the agent and offer to help or otherwise support the agent. A contact may be, for example, a conversation or interaction between an agent and a customer. Alternately or additionally, a supervisor may monitor the actions of agents within the contact center. For example, the supervisor may monitor agents to ensure they are not participating in activities that may affect the abilities of the agents to effectively participate in a contact, such as using a computer or other distracting items for personal use, being distracted by events occurring within the contact center, being distracted by other agents, or the like. By way of further example, the supervisor may monitor agents to ensure that they are available to take contacts and are not away from their work areas, excessively interacting with other agents, or the like.

The contact center may house many more agents than supervisors. Thus, for example, it may be difficult for supervisors to efficiently identify the agents that may benefit from supervisor attention from among all of the agents in the contact center. That is, problems may arise in contact centers and other situations where a relatively large number of workers or other people are being supervised by a relatively small number of supervisors. The supervisors may find it difficult to effectively monitor every agent often enough to catch even a minority of the situations where supervisor attention may be beneficial. Although a contact center may staff more supervisors to catch more situations where supervisor attention may be beneficial, doing so may be relatively costly. For example, staffing more supervisors may increase the costs of running the contact center, including supervisor salary costs and supervisor workspace costs, without a fully offsetting increase in revenue.

Some embodiments may include an augmented reality system for contact centers, which may improve supervisor efficiency. For example, supervisors may be able to supervise more agents per supervisor using the augmented reality system. Alternately or additionally, the augmented reality system may improve customer and agent satisfaction. For example, the augmented reality system may reduce supervisor reaction times in identifying contacts that may benefit from supervisor attention. Alternately or additionally, the augmented reality system may improve contact center efficiency. For example, the augmented reality system may enable supervisors to more efficiently identify instances of peak traffic and/or distracted, idle, or otherwise inefficient agents. Call center profitability may increase by enabling a supervisor to supervise a larger number of agents, thereby reducing the number of supervisors needed, and thus reducing cost.

Figure 2:
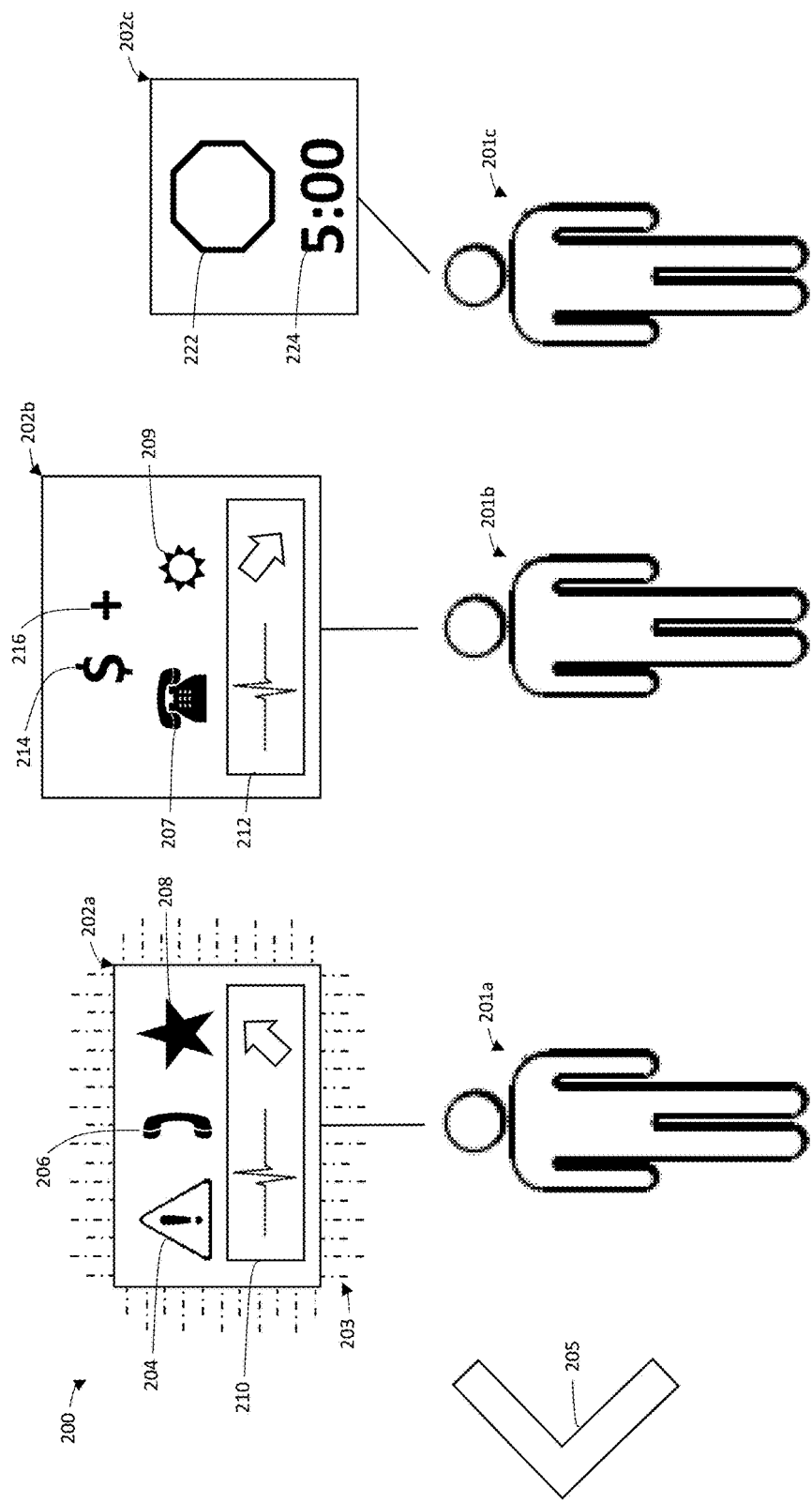
FIG. 2 is a representation of an example augmented view according to an embodiment of the invention.
Figure 3:
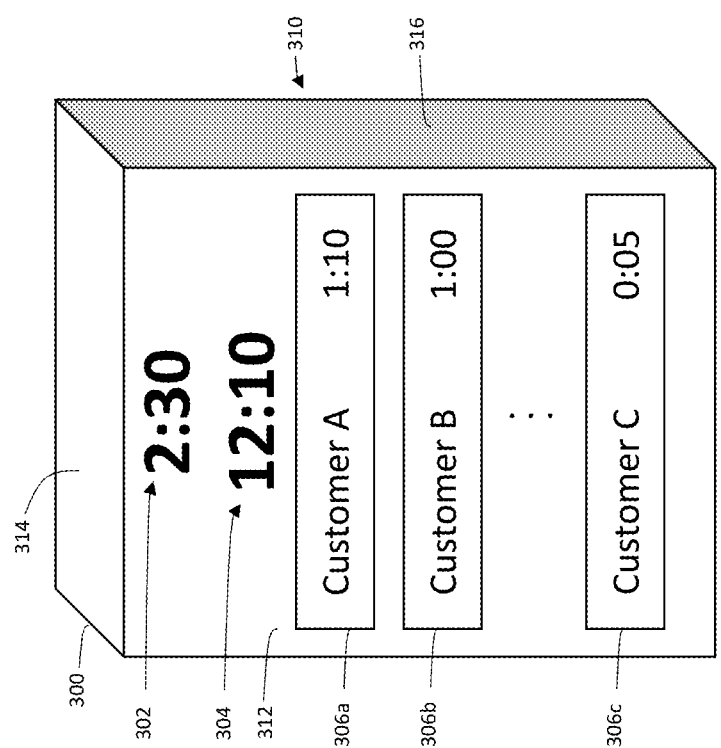
FIG. 3 illustrates an example customer or inbound queue augmentation artifact according to an embodiment of the invention.

In one embodiment, a supervisor is provided with an augmented reality device, such as glasses or a headset that allows the supervisor to see the world around him but also augments the field of view of the supervisor with information, graphics, etc. For example, information may be displayed regarding a person in an area in a field of view of an operator or supervisor, the area associated with location information associated with that person. The augmented reality device may respond to the gaze or direction of view of the supervisor, such that different visual information is provided depending on where the supervisor looks. Information regarding the subset of the people, agents, etc. who can be seen in the direction of gaze may be displayed. For example, when the supervisor looks at or in the direction of agent A, that supervisor may see superimposed above the head of agent A indications of agent A's performance (e.g., time spent on a current telephone call or a measure of sentiment of the customer interacting with the agent, e.g., as shown in FIG. 2); when the supervisor looks at or in the direction of agent B, that supervisor may see superimposed above the head of agent B indications of agent B's performance; and when the supervisor looks at or in the direction of a certain wall, that supervisor may see a superimposed on the wall a queue or line (e.g., inbound queue), or other indication, of waiting customers, e.g. customers waiting to speak with an agent (e.g., as shown in FIG. 3). For example, a central server or device 136 may instruct the display of the supervisor device to display a contact queue augmentation artifact visually representing a number of customers waiting to communicate with an agent, or customer entries visually representing customers (e.g. individual customers) waiting to communicate with an agent. Information which in prior art systems is confined to a computer screen may in some embodiments be placed in augmented space in the surroundings as seen by the supervisor. The contact or inbound queue (e.g. FIG. 3) augmentation artifact may be displayed at a particular location relative to the supervisor (e.g. the artifact may move with the supervisor's gaze or field of view to remain in the field of view or gaze) or at a particular location relative to the contact center (e.g. the artifact may be fixed in a virtual space and only appear if the supervisor's gaze or field of view includes it).

Although described in the context of a contact center, the same or a similar augmented reality system may be employed in other contexts where supervision of large numbers of people may be beneficial. For example, augmented reality systems may be employed on a stock exchange floor, at a convention, at a sporting event, or the like. Embodiments of the present invention may prove especially useful in hospital or other urgent-response environments, where one person needs to respond swiftly and accurately to a change in the situation or environment.

Reference will be made to the figures wherein like structures will be provided with like reference designations. The drawings are non-limiting, diagrammatic, and schematic representations of example embodiments, and are not necessarily drawn to scale.

FIG. 1 illustrates an example contact center augmented reality system 100. The contact center augmented reality system 100 may include a contact center 106. The contact center 106 may generally contract with one or more tenants (or patrons) to provide contact center services for the one or more tenants. The tenants may generally include business entities that have contracted with the contact center 106 for customer support, sales, and/or other contact center services from the contact center 106. One organization (e.g. one contact center 106 may use one central server 136, but in a multiple tenant configuration, central server 136 may service multiple organizations. Central server 136 may accept data and continually monitor data such as contacts (e.g., telephone calls, chat sessions) between workers/agents and customers, biofeedback data, position data of agents and supervisors, supervisor gaze data, and produce output, such as display data for supervisor augmented reality. Central server 136 may be located on-site at the place of employment, e.g., at a contact center 106, or may be located off site. For example, central server 136 may be implemented as a cloud computing device far from contact center 106.

The contact center 106 may be configured to communicate with multiple customers such as customer 102*a*, customer 102*b*, and customer 102*c* (collectively "customers 102"). The customers 102 may contact the contact center 106 via customer devices such as customer device 104*a*, customer device 104*b*, and customer device 104*c* (collectively "customer devices 104"). The customer devices 104 may include communication devices capable of communicating with the contact center 106. For example, the customer devices 104 may include telephone-capable devices such as conventional telephones, mobile phones, fax machines, voice over internet protocol (VoIP) enabled computers, or the like or any combination thereof. Alternately or additionally, the customer devices 104 may include devices enabled to communicate over short message service (SMS), multimedia messaging service (MMS), chat, videoconferencing, electronic mail (email), social media, and/or the like.

The contact center 106 may include multiple workers or agents to communicate with the customers 102. For example, the contact center 106 may include agent 109*a*, agent 109*b*, and agent 109*c* (collectively, "agents 109"). A customer or inbound queue 128 may represent or record the customers 102 that have contacted the contact center 106 and are waiting to communicate with one of the agents 109. For example, the customer queue 128 may include a queued customer 130*a*, a queued customer 130*b*, and a queued customer 130*c* (collectively "queued customers 130"). The state of the customer queue 128 may be of interest to the agents 109, supervisors, and other managers of the contact center 106.

The workers or agents may work from agent workstations located in the contact center 106. Information on agents, agent contacts, customers, and general contact center operations may be collected by for example central server 136. For example, the agents 109 may work from an agent workstation 110*a*, an agent workstation 110*b*, and an agent workstation 110*c* (collectively, "agent workstations 110"). Agents or workers may be associated with or mapped to a physical space by associating the worker with a workstation (e.g. when the agent operates or logs into the workstation), where the location of the workstation in physical space is known. The agent workstations 110 may include, or the agents 109 may otherwise be associated with agent devices for communicating with the customers 102. For example, the agents 109 may use an agent device 112*a*, an agent device 112*b*, and an agent device 112*c* (collectively "agent devices 112"). The agent devices 112 may include computers or other devices capable of allowing the agents 109 to communicate with the customers 102 via audio-based communication, text-based communication, video-based communication, or the like or any combination thereof. The agent devices 112 may include headsets and other peripherals, displays, or the like. For example, the agent devices 112 may each include one or more displays 114*a*, displays 114*b*, and displays 114*c* (collectively, "displays 114"). The one or more displays 114 may include conventional monitors and/or augmented reality devices.

Agents or workers may be associated with a location in physical space, for example defined by three-dimensional or two-dimensional coordinates associated with the physical space of the contact center or other facility. This physical space may be mapped to an augmented reality space. In one embodiment, the location of a number of workers, people, agents, etc. may be received for example by those people associating themselves with devices already at known locations. For example, the location of an agent is known by the system by associating the agent with a terminal or agent workstation 110, where the agent workstation 110 itself has been previously placed on a map or assigned a location in physical space known to the system. The system has a record of what terminal or workstation 110 the agent is associated with, and this determines the location. In another embodiment the agents 109, the agent workstations 110, or the agent devices 112 or any combination thereof may be associated with locators or radio transmitters. For example, the agents 109 may be associated with a locator 116*a*, a locator 116*b*, and a locator 116*c* (collectively "locators 116"). The locators 116 may transmit location information to a location tracker 132. For example, the locators 116 may transmit information describing the location of the locators 116 within the contact center 106 to the location tracker 132. The location tracker 132 and the locators 116 may be part of a positioning system. For example, the location tracker 132 and locators 116 may include portions of an indoor positioning system (IPS). In some embodiments, the location tracker 132 may include a system of nodes located within the contact center 106 that may sense the position of the locators 116 or may provide position data to the locators 116. In some embodiments, the locators 116 actively determine location information and transmit the determined location to the location tracker 132. Alternately or additionally, the locators 116 may passively provide tracking information to the location tracker 132, which may derive or otherwise refine the location information for the locators 116. Multiple location trackers 132 may receive signals from locators 116 and use triangulation to determine the locations of individual locators 116. Components such as a location tracker 132, state monitor 134, central server 136, and other components may communicate for example via one or more wired or wireless networks. Some devices such as supervisor devices 122 may communicate with other devices such as central server 136 via for example a radio link (e.g., via network interface 750 included in each device).

The location information for a worker or agent may be combined for example at a central server or device (e.g. in memory 720) with information associated with the agent to display this information in response to a supervisor's gaze including that agent. A field of view, or a gaze, of a user or supervisor of an augmented reality device may be received or determined, and information on agents or workers who appear within the field of view may be displayed to the user or supervisor. Thus information may be selectively displayed depending on or in response to a supervisor's gaze, and information may be selectively displayed at a virtual, simulated position, to be associated with the location of the relevant agent. An embodiment may correlate, link or connect the actual physical location of an agent with a location in an augmented reality space of the supervisor, or with a supervisor view associated with the supervisor, and may correlate or link the identity of that agent with information on the agent held within the system (e.g., information on the current contact the agent is involved in stored in memory 720) in order to display the artifact at a location associated with the agent.

In some embodiments, the agents 109 may be associated with biofeedback devices, which may sense physiological information regarding the agents 109 and may transmit the physiological information to a receiver such as a network interface 750 associated with central server 136. Central server 136 may determine, analyze and monitor agents', customers' or contacts states or other data, based on information received. For example, central server 136 may accept data (such as the transcript of the current contact which may be generated automatically, emotional analysis of the current contact, and other information) and calculate sentiment, for example sentiment of a contact, a customer, or agent. For example the agents 109 may be associated with a biofeedback device 118a, a biofeedback device 118b, and a biofeedback device 118c (collectively "biofeedback devices 118"). The biofeedback devices 118 may gather physiological information from the respective agents 109 and may transmit the physiological information to for example a state monitor 134. By way of example, the biofeedback devices 118 may include cameras capturing images of the agents 109 and biofeedback sensors worn by the agents 109 (e.g. exercise bands). For instance, the biofeedback devices 118 may include wrist-based sensors, finger-based sensors, chest-based sensors, head-based sensors, or the like or any combination thereof. Alternately or additionally, the biofeedback devices 118 may include sensor(s) located in or integrated with the agent workstations 110, the agent devices 112, the locators 116, or the like or any combination thereof. In some embodiments, the biofeedback devices 118 may include conventional heath- and activity-tracking devices. Receivers or transceivers such as state monitor 134 and location tracker 132 may be combined into one unit, for example one unit that also transmits and receives information to control the displays of devices 122 and/or 110. Such a device may be for example network interface 750.

The biofeedback devices 118 may collect and provide the state monitor 134 with various data regarding the agents 109. By way of example, the biofeedback devices 118 may collect data regarding heart rate, posture, blood pressure, pupil dilation, respiration, perspiration, skin temperature, stress levels, or the like or any combination thereof. In some embodiments, the biofeedback devices 118 may use the sensed physiological information from the agents 109 to derive a state or states of the agents 109. Alternately or additionally, the state monitor 134 may use the sensed physiological information to derive or otherwise refine the state or states of the agents 109. By way of example, the agents 109 may be associated with states such as calm, neutral, agitated, alert, tired, tense, relaxed happy, angry, or the like or any combination thereof. The state may describe the agent in a general manner.

The contact center 106 may also include one or more supervisors such as a supervisor 120a and a supervisor 120b (collectively "supervisors 120"). The supervisors 120 may be tasked with supervising the agents 109. For example, the supervisors 120 may be in charge of training the agents 109, observing the agents 109 while working, conducting performance evaluations of the agents 109, keeping the agents 109 on task, assisting the agents 109 during contacts with the customers 102, or the like. By way of example, the supervisors 120 may assist the agents 109 with contacts with the customers 102 by coaching the agents 109 in a manner that only the agents 109 can hear, by joining the agents 109 and the customers 102 in a contact, or by replacing the agents 109 in a contact. Alternately or additionally, the supervisors 120 may physically move to the locations of the agents 109 the supervisors 120 are assisting. There, the supervisors 120 may provide nonverbal communication to the agents 109, such as gestures or expressions of support, encouragement, approval, disapproval, prompting, or the like.

Supervisor devices such as a supervisor device 122a and a supervisor device 122b (collectively, "supervisor devices 122") may be associated with the supervisors 120. The supervisor devices 122 may be augmented reality devices and may include displays, such as a display 124a and a display 124b (collectively "displays 124"). Supervisor devices 122 may be for example glasses or goggles similar to the Microsoft HoloLens™ system; other devices may be used as well.

The location of the supervisor devices 122 may be monitored or determined for example by central server or processor 136 or another device. For example, the supervisor devices 122 may include locators such as a locator 126a and a locator 126b (collectively "locators 126"). Locators 126 may for example transmit radio signals (e.g., WiFi or other signals) received at for example a set of location trackers 132 which may use for example triangulation to determine the location of each supervisor device 122.

In another embodiment locators 126 may correspond generally to the locators 116 and may transmit location information regarding the locations of the supervisors 120 to the location tracker 132. Alternately or additionally, the location information may be used to generate augmentation artifacts on the displays 124 that reflect the positions and orientations of the respective supervisor devices 122. Thus, for example, the displays 124 may augment the contact center 106 views of the supervisors 120.

Figure 5:
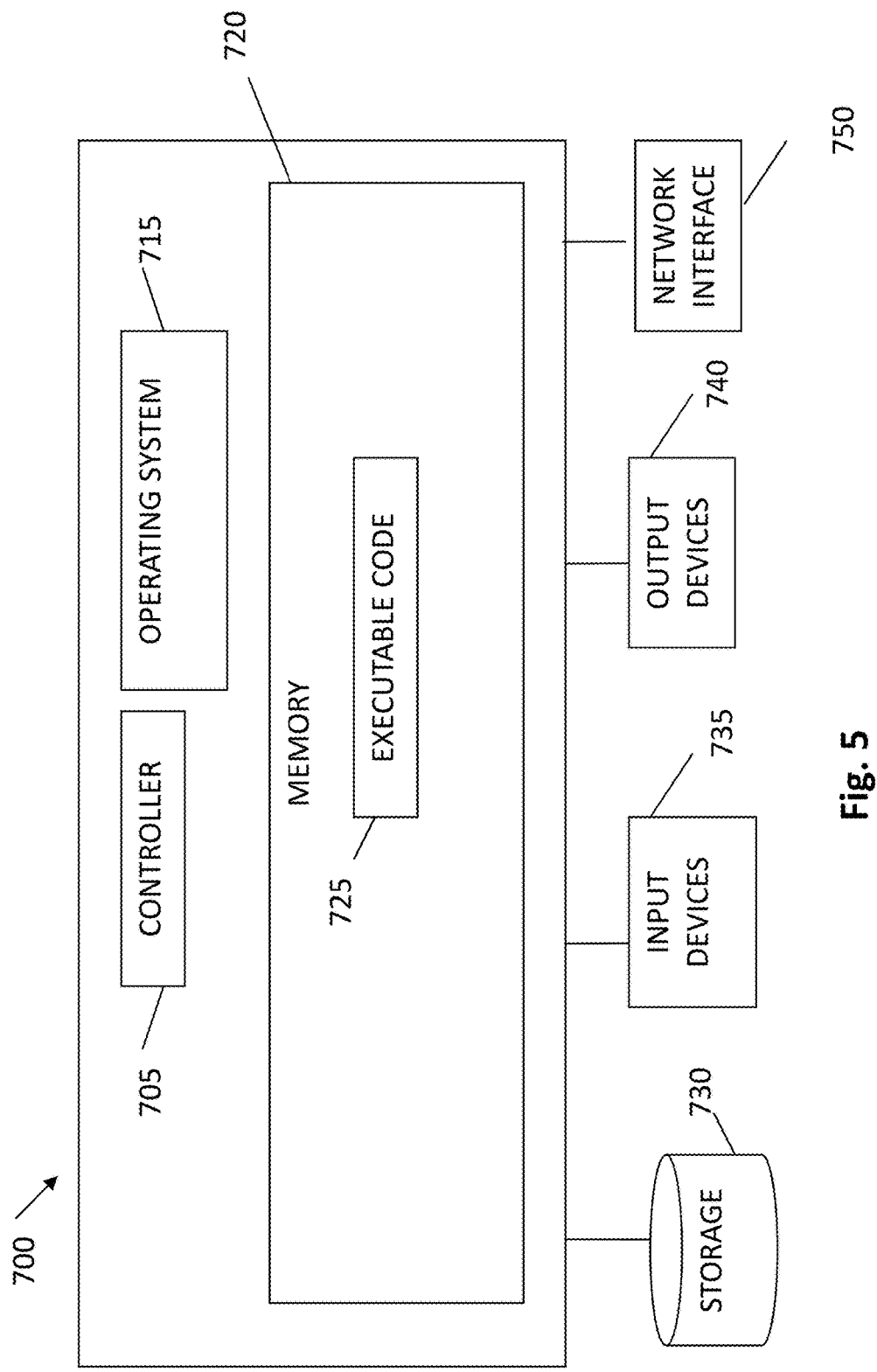
FIG. 5 illustrates an example computing device according to an embodiment of the invention.

In some embodiments, a central server 136 (e.g. including a processor and memory for example as shown in FIG. 5) may perform some or all functions described herein, for example receiving location information (e.g., from sensors, from workstations), receiving agent and customer information (e.g., call or contact status, queue status), and producing augmented reality to be displayed on supervisor devices 122, and possibly other functions such as allowing for supervisor/agent feedback. Central server 136 may be for example a workstation or personal computer located at a workplace or call center, or may be implemented by a remote server (e.g., in the "cloud").

Central server 136 may control or instruct the displays 124 of the supervisor devices 122 to display information such as augmentation artifacts that inform the supervisors 120 of states of contacts, the workers or agents 109, the other supervisors 120, the contact center 106, or the like. The information may be provided in a virtual reality space associated with the physical space associated with the worker or agent. The augmentation artifacts may be for example positioned (from the perspective of the viewer) at locations associated with the agents 109. For example, when a supervisor looks towards agent A, device 122 worn by that supervisor may augment the view to include information which appears to be on, near, or over agent A, the information describing for example the status of the agent, the status of a contact or call currently associated with the agent, etc. When that supervisor turns his gaze towards agent B, device 122 may augment the view, which includes the room and agent B, to include information describing for example the status of agent B, etc. In some embodiments, all supervisors 120 may be responsible for supervising all agents 109. Alternately, each of the supervisors 120 may be responsible for a subset or team of agents 109. In some configurations, supervisors 120 may be responsible for a team of agents 109, but may supervise agents 109 from another team when the responsible supervisor is busy, when an agent from another team has a critical need of supervision, or the like. While the context of a call center is described herein, embodiments of the present invention may be used with employees and supervisors in other contexts, or contexts where the relationship among people is not employee/supervisor.

In some embodiments, the supervisor devices 122 may include or be associated with controllers or input devices for controlling or providing input. For example, the supervisor device 122a may include a controller 127a and the supervisor device 122b may include a controller 127b (collectively "controllers 127"). Alternately or additionally, the agent devices 112 may include controllers. For example, the agent device 112a may include a controller 129a, the agent device 112b may include a controller 129b, and the agent device 112c may include a controller 129c (collectively "controllers 129").

The controllers 127 and the controllers 129 may include handheld or hand-worn devices, such as a pointer device or a glove-type device having integrated sensors, e.g. motion sensors, position sensors, or touch sensors, that may be worn on a hand or hands. The controllers 127 may also include sensors associated with the person or not attached to the person that detect the position or movement of hands, head, facial expressions, limbs such as the arms, and the like. Thus control by the supervisor may be made for example by the supervisor making gestures with hands. The controllers 127 and the controllers 129 may provide input to augmented reality system 100 and/or instruct the augmented reality system 100 (e.g. instruct central server 136) to perform tasks based on movement of the persons associated with controllers 127 and the controllers 129, and interactions with the inputs of the controllers 127 and the controllers 129, such as motions, buttons, dials, switches, or the like. Controllers or input devices other than gloves may be used. The controllers 127 and the controllers 129 may include or be associated with microphones and speech-recognition apparati configured to control for example the supervisor devices 122 or agent devices 112 when supervisors or agents issue spoken commands.

Supervisors 120 may use the controllers 127 to virtually interact with or provide input or communications to agents 109, for example at a distance. For instance, the supervisors 120 may make a tapping motion toward a particular agent with a glove-style controller and the augmented reality system 100 may alert the particular agent that a supervisor has interacted with the agent. For example, the agent may receive an audio prompt, a visual prompt, a haptic prompt, or the like. Supervisors 120 may issue spoken commands and the augmented reality system 100 may alert the particular agent that a supervisor has interacted with the agent.

In some embodiments, in response to input to a controller 127 the supervisors 120 may be shown, e.g. on supervisor device 122, a reproduction of a display of a particular agent, or other information. As such, controller 127 may provide input which alters the display of supervisor device 122. Pointing at, speaking a vocal command, or otherwise selecting an area of the reproduced display may cause the counterpart display of the agent to call out the area of the display selected by the supervisor. Agents and supervisors may also provide input via traditional means, for example keyboard, mouse, touchscreen.

Displays 114 may include augmented reality capability. In some embodiments, central server 136 may instruct the displays 114 to display augmentation artifacts that inform the agents 109 of states of contacts, the agent workstations 110, other agents 109, the supervisors, the contact center 106, or the like. In some embodiments, the agents 109 may control the agent workstations 110 via the controllers 129. For example, the agents 109 may issue spoken commands or use a horizontal swiping motion using glove-style controllers 129 to temporarily remove contacts that are not time sensitive, such as email contacts, from a customer or inbound queue of the agents 109 when the agents 109 are too busy to deal with them. Alternately or additionally, the agents 109 may use a vertical swiping motion using the glove-style controllers 129 to scroll through lists such as the individual agent queues, lists of pre-written responses, or the like. In some configurations, the agents 109 may issue a spoken command or use a pointing motion using the glove-style controllers 129 to select contacts in the personal queues, the pre-written responses, or the like.

FIG. 2 is a schematic representation of an example augmented view 200 seen by a supervisor viewing the environment using supervisor devices 122. View 200 may generally correspond to a view shown to the supervisors 120 via the displays 124. The view 200 may be of agents including an agent 201a, an agent 201b, and an agent 201c (collectively "agents 201"). The agents 201 may generally correspond to the agents 109 of FIG. 1, and may be real—e.g., actual agents visually perceived by the supervisor.

Each of the agents 201 may be associated with an agent augmentation artifact, which may be augmented and produced on displays 124. An agent augmentation artifact 202a may be associated with the agent 201a, an agent augmentation artifact 202b may be associated with the agent 201b, and an agent augmentation artifact 202c may be associated with the agent 201c (the augmentation artifact 202a, the augmentation artifact 202b, and the augmentation artifact 202c may be collectively referenced as "augmentation artifacts 202"). The augmentation artifacts 202 may display states of the agents 201. The augmentation artifacts 202 may be displayed at locations associated with the respective agents 201. The augmentation artifacts 202 may be displayed on displays 124 such that artifacts 202 are displayed in the field of view of the supervisor such that the supervisor sees the artifact which is associated with an agent in the same place, near, above, or on that agent. For example, information 202b is displayed so that to the supervisor it appears to be near or on agent 201b.

Although augmentation artifacts 202 are shown for each of the agents 201, in a contact center setting, the augmentation artifacts 202 may be shown for fewer than all of the agents in the view of a supervisor. In some embodiments, an augmentation artifact may appear for an agent while a supervisor is focused on the agent. Thus central server 136 or another device may control display 124 such that the supervisor's field of view determines what information is provided on control display 124. For example, an augmentation artifact may appear for an agent that is centered in a supervisor's view and may disappear when the agent is no longer centered in the supervisor's view. Alternately or additionally, eye tracking systems may be used to monitor where a supervisor is looking and augmentation artifacts may be shown for agents 201 the supervisor is looking at, regardless of the location of the agent in the field of view of the supervisor.

In some embodiments, the contact center augmented reality system may show augmentation artifacts for particular agents 201 to alert the supervisors to particular agents 201, particular groups of agents 201, particular situations (e.g., negative sentiment), or the like. In some configurations, augmentation artifacts may flash, may be shown in a particular color, or may be otherwise accentuated to draw the attention of a supervisor. For example, augmentation artifact 202a includes an accentuation or highlighting 203; other artifacts 202b and 202c may be included. In some embodiments, the accentuation 203 may be removed when the system determines that the supervisor has noticed the accentuated augmentation artifact 202c. Augmentation artifacts 202 meant to alert a supervisor to a particular agent, situation, or the like may be described herein as alarms. In some embodiments, alarms may be accompanied by an audible alert, a haptic alert such as a vibration of the supervisor devices, a flash or other change shown on the display, a symbol such as a storm cloud, and the like. Alternately or additionally, an orientation artifact 205 may be displayed to orient the supervisor to alerts located outside of the field of view of the supervisor. For example, information associated with an agent may be accentuated or highlighted when that agent is angry beyond a threshold, when the customer currently in contact with that agent is angry beyond a threshold, when sentiment for the contact associated with the agent is negative beyond a threshold, etc.

The augmentation artifacts 202 may provide the supervisors with extensive data regarding a state of an agent, a state of a contact, a state of a contact queue, a state of the contact handling system, a state of other supervisors, or the like or any combination thereof. Sentiment information may be provided, for example sentiment of a contact, a customer, or agent.

By way of example, the augmentation artifact 202a may include a contact sentiment indicator 204. As shown, the contact sentiment indicator 204 may indicate that a contact may have become tense, a customer may be unhappy, frustrated, angry, or otherwise dissatisfied, or the opposite, e.g. a customer or agent is happy. The contact sentiment indicator 204 may be based on sentiment analysis performed through contact monitoring via a state monitor, such as the state monitor 134 of FIG. 1. For example central server 136 may accept data such as that provided by state monitor, perform analysis such as sentiment analysis, and control supervisor devices 122 to display the appropriate information. The sentiment analysis may identify sentiments of the contacts and may display the contact sentiment indicator 204 to indicate the sentiments of the contacts, and/or of the agents. The contact sentiment indicator 204 may also indicate when the customer is satisfied, when the customer has expressed thanks or praise, when the customer or agent is yelling, when the customer or agent has used profanity, or the like or any combination thereof.

The augmentation artifact 202a may also include an on-contact indicator 206. The augmentation artifact 202b may include a counterpart off-contact indicator 207. The on-contact indicator 206 and the off-contact indicator 207 may indicate whether the agents 201 are currently participating in a contact. The augmentation artifact 202c may include an on-break indicator 222, which may indicate that the agent 201c is not participating in a contact and is not available to participate in a contact. The augmentation artifact 202c may also include a break timer 224, which may indicate the length of time the agent 201c has been on break.

Alternately or additionally, the augmentation artifact 202a may include a premium customer indicator 208, which may signify that the customer participating in the contact with the agent 201a is a high-priority customer. The augmentation artifacts 202 may indicate whenever or that agents 201 meet certain criteria, or meet certain performance thresholds. For example, the augmentation artifact 202b may include a recent sale badge 214, which may indicate that the agent 201b recently sold a customer goods or services, and a recent positive survey badge 216, which may indicate that a customer responded positively to a survey regarding a contact with the agent 201b.

In some embodiments, the augmentation artifacts 202 may include indicators regarding stress or other emotion levels of the agents 201. For example, the augmentation artifact 202a may include an agitated stress level indicator 210 showing that the agent 201a is relatively agitated. The augmentation artifact 202b may include a calm stress level indicator 212 showing that the agent 201b is relatively calm. The stress level indicators may be based on physiological information gathered from the agents 201.

Alternately or additionally, the augmentation artifact 202b may include a supervisor assistance flag or indication 209 which may be displayed to a supervisor in response to the agent 201b requesting supervisor assistance. In some embodiments, the agents 201 may request supervisor assistance through an agent workstation generally corresponding to the agent workstations 110 of FIG. 1, such as through the controllers 129. A supervisor assistance flag may prompt accentuation of the corresponding augmentation artifacts 202. A state of an agent may include a request for supervisor assistance made by the agent, and an agent augmentation artifact may include an indication of the request for supervisor assistance.

Alternately or additionally, the augmentation artifacts 202 may include further indicators, badges, alerts, timers, statistics, or the like. For example, the augmentation artifacts 202 may include indicators of whether an agent is available to take a contact or to participate in a new contact or telephone call, is in training, is in post-contact follow up, or is exhibiting poor posture that may contribute to an injury. Alternately or additionally, the augmentation artifacts 202 may include an average time on contact, a current contact timer (e.g. the length of the current telephone call or interaction), a recent negative survey badge, a sales efficiency, or the like.

In this and other embodiments, colors, sizes, animations, and brightness of the augmentation artifacts 202 and the various icons, indicators, badges, flags, timers, and the like may be used to convey information to the supervisors. For example, red colors may indicate warnings; green colors may indicate acceptable states, statuses, or times; of the like or any combination thereof. Customers may be displayed as customer entries, and sizes or colors of the customer entries displayed may visually represent wait times or priorities of the customers associated with the customer entries.

In some embodiments, an augmentation artifact, such as the augmentation artifact 202c, may be displayed (from the supervisor's perspective) as if the augmentation artifact is farther away from the supervisor than the agent with whom the augmentation artifact is associated. For example, an augmentation artifact may be shown at a perceived distance of three meters or more, even in scenarios when an associated agent is closer than three meters. Thus, the augmentation artifacts may be less likely to disorient a supervisor viewing the augmentation artifact.

Other information or artifacts may be provided via supervisor device 122 using augmented reality. Such information or artifacts may include for example information on customers waiting in a queue, information on customers or agents overall not particular to any agent, or other information. Such information or artifacts may be provided (when perceived by a supervisor) in a fixed position in a room, and may be displayed via supervisor device 122 when the supervisor is looking at that position: for example a customer queue relevant to agents assigned to a supervisor may be seen by a supervisor superimposed on a wall only when that supervisor looks at the wall, and the wall (reality) may be seen with the information superimposed on the wall.

FIG. 3 illustrates an example customer queue augmentation artifact 300. The customer queue augmentation artifact 300 may generally represent the customer queue 128 of FIG. 1. The customer queue augmentation artifact 300 may be shown on displays of agents, supervisors, or other managers of a contact center. For example, the customer queue augmentation artifact 300 may be shown on the displays 114 of the agents 109 and the displays 124 of the supervisors 120 of FIG. 1.

The customer queue augmentation artifact 300 may show a wide variety of information regarding the customer queue of the contact center. The information shown on the customer queue augmentation artifact 300 may be different for different groups, such as teams, supervisors and agents, and may be different for different individuals within the groups. By way of example, the customer queue augmentation artifact 300 may show an average customer wait time 302. Alternately or additionally, the customer queue augmentation artifact 300 may show a current average duration of contacts 304, although the information that may be shown by the customer queue augmentation artifact 300 is not limited to these examples. In some configurations, the customer queue augmentation artifact 300 may display a number of customers waiting to communicate with an agent, or visually represent customers (e.g. individual customers) waiting to communicate with an agent.

The average customer wait time 302 and the average duration of contacts 304 may be shown on a face 312 of the customer queue augmentation artifact 300. While a specific artifact 300 is shown, other displays or artifacts may be used. In some embodiments, the face 312 may be colored to represent a state of some statistic or statistics, such as the average customer wait time 302 and the average duration of contacts 304. For example, the face 312 may be a first color, such as red, if a statistic is below a benchmark and may be a second color, such as green, if the statistic is above the benchmark. Thus, an observer of the customer queue augmentation artifact 300 may be able to determine a state of a statistic of interest with a quick glance at the customer queue augmentation artifact 300.

In this and other embodiments, augmentation artifacts may be displayed as three-dimensional artifacts. For example, a third dimension of an augmentation artifact may represent a length of time. By way of example, a third dimension 310 of the customer queue augmentation artifact 300 may include a representation change in information, statistic or statistics over time (e.g., information regarding customers waiting to communicate with an agent), while the face 312 of the customer queue augmentation artifact 300 may represent the present time. For instance, a representation of a third dimension 310 at a top 314 of the customer queue augmentation artifact 300 may represent a change in the average customer wait time 302 over some length of time, such as an hour, multiple hours, multiple days, or the like. The side 316 may similarly represent a change in the average duration of contacts 304 over time. By way of example, if the average customer wait time 302 has improved significantly over time, the top 314 may transition from a first color signifying a poor average customer wait time 302 to a second color signifying a good average customer wait time 302. Thus, an observer of the of the customer queue augmentation artifact 300 may recognize a trend in relevant statistics over time and may derive more context regarding the customer queue and potentially the information shown on the face of the customer queue augmentation artifact 300.

In some embodiments, the customer queue augmentation artifact 300 may be anchored at a particular location or locations in a contact center, such that the customer queue augmentation artifact 300 is displayed to agents or supervisors who look at the particular location or locations, typically only when the agents or supervisors are looking at the location. Alternately or additionally, the customer queue augmentation artifact 300 may be anchored at a location relative to a user. For example, the customer queue augmentation artifact 300 may be displayed to agents or supervisors who look up, to their left, or the like. Alternately or additionally, the customer queue augmentation artifact 300 may be displayed on demand to users who make some input on a controller.

The customer queue augmentation artifact 300 may display a representation of waiting customers. For example, the customer queue augmentation artifact 300 may display a queue including a customer entry 306a, a customer entry 306b, and a customer entry 306c (collectively "customer entries 306"). As shown, the customer entries 306 may be displayed with a length of time the associated customers have been waiting.

In some embodiments, the appearance of the customer entries 306 may indicate a wait time, a priority or other status of the customers associated with the customer entries 306. For example, the customer entries 306 may be enlarged or priority customers, the customer entries 306 may change to a particular color as the wait time nears a threshold wait time, or the like or any combination thereof. Thus, states of waiting customers can be quickly visualized and potential issues, such as priority customers nearing a threshold wait time, may be identified and potentially dealt with in a timely manner.

In some embodiments, the customer entries 306 may be shown or displayed to move or dart from the contact queue augmentation artifact or symbol to particular agents (from the perspective of a supervisor viewing augmented reality), e.g., from the position of the queue to the position of the agent, when agents are, or in response to the agents being assigned to, the customers represented by the customer entries 306, or when the agents engage in the contact with the customers. Thus, the flow or movement of the waiting customers to agents may be visualized.

Customer entries, such as the customer entries 306, may be displayed on, or superimposed on, a map of a geographic location. The contact queue augmentation artifact may include a visual representation of geographic locations of the customers waiting to communicate with the agents. For example, the customer entries 306 may be shown on a map of the world or of the United States displayed by the customer queue augmentation artifact 300. The customer entries 306 may be shown in the locations of the associated customers. In some embodiments, the numbers of customer entries located at different areas of the map may be represented by a heat map, bubble map, or the like. Thus, an observer of the customer queue augmentation artifact 300 may quickly recognize a geographically-based trend. For example, an observer may note an uptick in the number of customers contacting the contact center from the west coast of the United States, potentially signifying the start of a rush of contacts.

Figure 4:
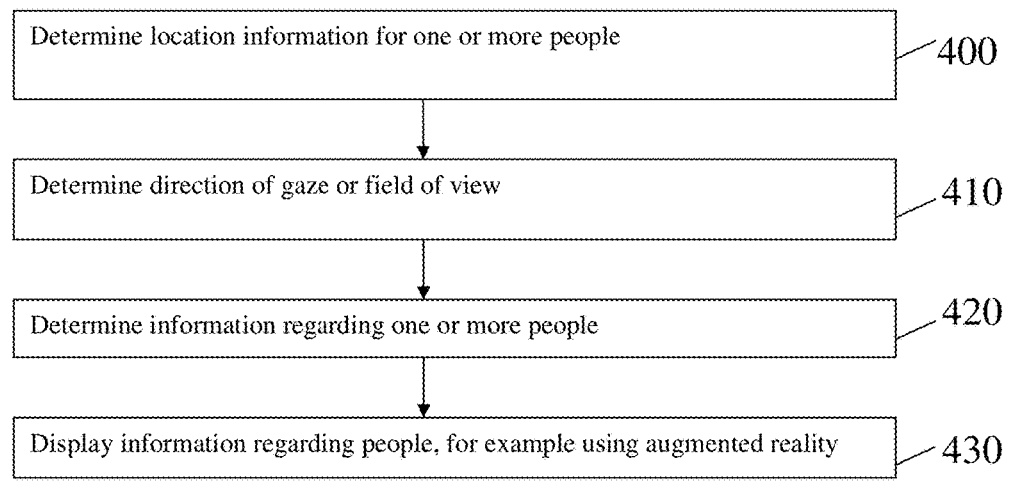
FIG. 4 illustrates an example flowchart according to an embodiment of the invention.

FIG. 4 illustrates an example flowchart according to an embodiment of the invention.

In operation 400, location information may be determined for one or more people such as workers, agents, etc. For example, the people may be associated with computers, the location of which is known, or the people may be located using for example radio devices worn on their person.

In operation 410, information regarding a direction of gaze or field of view of another person such as a supervisor or operator may be determined. Information regarding the location of the supervisor or operator may also be determined.

In operation 420, information regarding people, workers, agents, etc. may be determined, collected, or received—for example state information, job performance information, contact or telephone conversation information, etc.

In operation 430, information regarding people, workers, agents, etc. may be displayed, for example using an augmented reality headset, in the field of view or direction of gaze of the supervisor or operator. Typically, the information is only on the people located in the field of view or gaze, and typically the information is located near or associated with the people associated with the information.

FIG. 5 illustrates an example computing device according to an embodiment of the invention. Various components such as central server 136, supervisor devices 122, agent workstations 110, agent devices 112, state monitor 134, location tracker 132, supervisor devices 122 and other modules, may be or include computing device 700, or may include components such as shown in FIG. 5.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include an application to gather agent information and display the information in augmented reality. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 5 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device, and may for example include controllers 127 and controllers 129. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a WiFi or Bluetooth device or connection, a connection to an intranet or the internet, etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

Embodiments of the present invention may improve augmented reality technology by for example combining location information, and information collected from agents associated with location information, and presenting this information in a form much more quickly, easily, and intuitively accessible than with traditional methods of accessing such information.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A contact center augmented reality system comprising:
a supervisor augmented reality device comprising a display to augment a supervisor view of the contact center such that a supervisor using the device is presented with an actual view augmented by augmentation artifacts; and
a processor to:
monitor agent locations in the contact center;
monitor a location of the supervisor device in the contact center;
monitor a state of agents of the contact center;
monitor a gaze of the supervisor; and
instruct the display of the supervisor device to display an agent augmentation artifact
such that a state of a first agent of the contact center is displayed at a location associated with the first agent and such that one or more augmentation artifacts for one or more agents who appear within the field of view of the supervisor are displayed.

2. The system of claim 1 wherein the processor is to correlate the actual location of the first agent with a location in an augmented reality space of the supervisor view to display the artifact at a location associated with the first agent.

3. The system of claim 1 wherein the state of the first agent displayed at the agent augmentation artifact by the supervisor device includes a stress level of the first agent, the stress level of the first agent based at least in part on first physiological information reported by a first biofeedback device worn by the first agent.

4. The system of claim 1, wherein the processor is to monitor a state of the contacts being handled by the contact center via sentiment analysis.

5. The system of claim 1, wherein the agent augmentation artifact includes a contact sentiment indicator to indicate a sentiment of a contact, a customer, or agent.

6. The system of claim 1, wherein the processor augmenter instructs the display of the supervisor device to display a contact queue augmentation artifact including customer entries visually representing customers waiting to communicate with an agent.

7. The system of claim 6, wherein sizes of the customer entries visually represent wait times or priorities of the customers associated with the customer entries.

8. The system of claim 6, wherein a first customer entry is displayed as moving from the contact queue augmentation artifact to the first agent in response to a first customer associated with the first customer entry being assigned to the first agent.

9. The system of claim 6, wherein the contact queue augmentation artifact further includes a visual representation of geographic locations of the customers waiting to communicate with the agents.

10. The system of claim 1, further comprising a first agent device including a second display to augment a view of the contact center of the first agent.

11. The system of claim 10, wherein the augmenter further instructs the second display of the first agent device to display a contact queue augmentation artifact including customer entries visually representing customers waiting to communicate with an agent.

12. The system of claim 1, wherein the state of the first agent includes a request for supervisor assistance made by the first agent and the agent augmentation artifact includes an indication of the request for supervisor assistance.

13. The system of claim 1, further comprising a controller for controlling or providing input to the supervisor device.

14. The system of claim 13, wherein the controller includes a glove worn by the supervisor and controlling the supervisor device is performed through gestures made with the glove.

15. The system of claim 13, wherein the controller comprises a position sensor controlling the supervisor device using gestures made with the supervisor's hands.

16. The system of claim 13, wherein the controller comprises a microphone and a speech recognition component controls the supervisor device through spoken commands from the supervisor.

17. A method for providing information, the method comprising:
monitoring information related to a plurality of workers;
determining a field of view of a user of an augmented reality device comprising a display, the display presenting the user with an actual view augmented by augmentation artifacts;
associating each of the workers with a location in physical space;

providing to the user, via the augmented reality device, information regarding a worker within the field of view in an augmented reality space associated with the physical space associated with the worker.

18. The method of claim 17, wherein each worker is associated with a physical space by associating the worker with a workstation, the location of the workstation in physical space being known.

19. A method for providing augmented reality, the method comprising:

receiving location information regarding a plurality of people;

receiving information regarding a direction of gaze an operator, the operator wearing an augmented reality headset comprising a display to augment a view of the people such that the operator is presented with an actual view of actual people augmented by augmentation artifacts; and displaying in the augmented reality headset, information regarding a subset of the actual people who can be seen in the direction of gaze, based on the location information associated with the actual people who can be seen in the direction of gaze.

20. The method of claim 19, comprising displaying information regarding a person in an area in a field of view of an operator associated with the location information associated with that person.

21. The method of claim 19, wherein the information comprises a state of the person or a state of contacts associated with that person.

* * * * *